United States Patent
Chiu

(10) Patent No.: US 8,279,591 B2
(45) Date of Patent: Oct. 2, 2012

(54) ELECTRONIC DEVICE

(75) Inventor: Hsien-Cheng Chiu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 395 days.

(21) Appl. No.: 12/705,201

(22) Filed: Feb. 12, 2010

(65) Prior Publication Data

US 2010/0246106 A1    Sep. 30, 2010

(30) Foreign Application Priority Data

Mar. 27, 2009   (TW) .............................. 98110187 A

(51) Int. Cl.
*G06F 1/16*   (2006.01)
(52) U.S. Cl. ......... 361/679.27; 361/679.02; 361/679.26; 381/87; 381/332; 381/382
(58) Field of Classification Search .............. 361/679.27
See application file for complete search history.

(56) References Cited

U.S. PATENT DOCUMENTS

| | | | | |
|---|---|---|---|---|
| 5,838,537 | A * | 11/1998 | Lundgren et al. | 361/679.27 |
| 6,067,224 | A * | 5/2000 | Nobuchi | 361/679.27 |
| 6,243,260 | B1 | 6/2001 | Lundgren | |
| 6,972,944 | B2 | 12/2005 | Clapper | |
| 7,200,000 | B1 * | 4/2007 | Huang | 361/679.55 |
| 8,152,147 | B2 * | 4/2012 | Yang | 267/155 |

FOREIGN PATENT DOCUMENTS

| | | |
|---|---|---|
| CN | 2280958 | 5/1998 |
| CN | 2400817 | 10/2000 |
| TW | 373741 | 11/1999 |
| TW | 405796 | 9/2000 |
| TW | I301338 | 9/2008 |

\* cited by examiner

*Primary Examiner* — Anthony Q Edwards
(74) *Attorney, Agent, or Firm* — Muncy, Geissler, Olds & Lowe, PLLC

(57) ABSTRACT

An electronic device includes a first body, a second body, a first pivot, an audio module, a second pivot, a cam, a follower, a latch, and an elastic element. The first pivot pivotally connects the first body with the second body. The second pivot pivotally connects the audio module with the second body. The cam is coupled with the first pivot. The follower contacts the cam. The latch is fastened to the audio module and connected with the follower. The elastic element includes two ends, one is against the second body, and the other one is against the audio module.

10 Claims, 6 Drawing Sheets

US 8,279,591 B2

ELECTRONIC DEVICE

RELATED APPLICATIONS

This application claims priority to Taiwan Application Serial Number 98110187, filed Mar. 27, 2009, which is herein incorporated by reference.

BACKGROUND OF THE INVENTION

1. Field of the Invention

The invention relates to an electronic device and, more particularly, to an audio assembly of an electronic device.

2. Description of the Related Art

A conventional notebook computer is usually equipped with an audio amplifier fixedly embedded in a computer housing. A plurality of holes are formed on the computer housing corresponding to the audio amplifier for the sound outputted from the audio amplifier to be transmitted via the holes on the computer housing, and thus for users to hear. However, since the sound outputted by the audio amplifier is transmitted from the computer housing and does not have any directivity, the transmitting effect of sound is unsatisfied.

As a result, persons in the field launch the audio amplifier capable of facing the user to provide the directivity characteristic of the sound. However, in this design, the user usually further needs to operate the audio amplifier manually to make the audio amplifier face the user when he or she listens to the music. As a result, the convenience of the notebook computer is reduced, and thus the user may be unwilling to buy the notebook computer.

BRIEF SUMMARY OF THE INVENTION

As a result, the invention provides an electronic device.

According to an embodiment of the invention, the electronic device includes a first body, a second body, a first pivot, an audio module disposed on the second body, a second pivot, a cam, a follower, a latch, and an elastic element. The first pivot pivotally connects the first body with the second body. The second pivot pivotally connects the audio module with the second body. The cam and the first pivot are coupled with each other. The follower contacts the cam. The latch is fastened to the audio module and connected with the follower. The elastic element includes two ends, one is against the second body, and the other one is against the audio module.

When the user opens the first body and the second body, the first pivot pivotally connecting the first body and the second body drives the cam to rotate to make the follower contacting the cam produce displacement. The displacement makes the latch detached from the audio module, and thus the audio module is ejected from the second body by the elastic element and faces a user.

These and other features, aspects and advantages of the present invention will become better understood with regard to the following description, appended claims, and accompanying drawings.

DETAILED DESCRIPTION OF THE EMBODIMENTS

An electronic device in the present invention is not limited, and more preferably, are clamshell-type electronic devices such as a personal digital assistant (PDA), an electronic dictionary, a notebook computer, a mobile phone hereinafter. The notebook computer is taken as an example to illustrate embodiments of the invention hereinafter.

Figure 1:
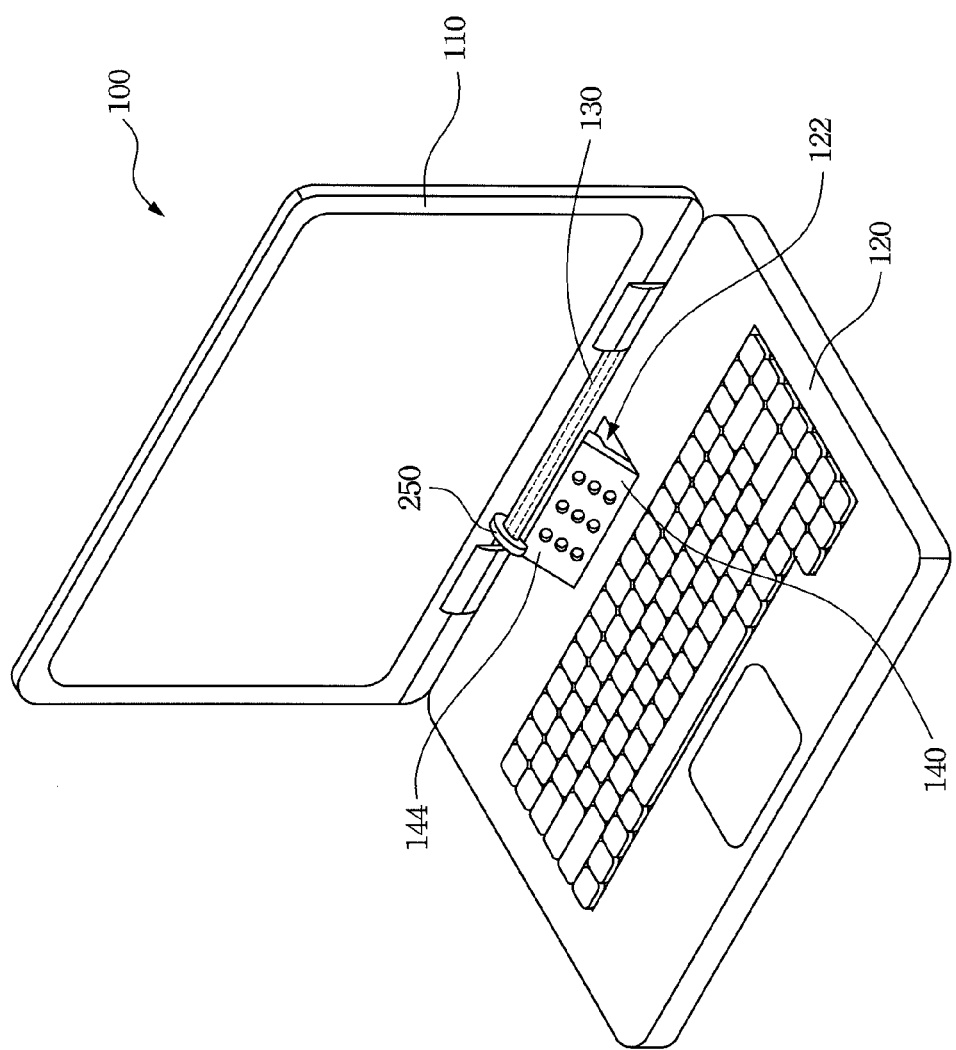
FIG. 1 is a three-dimensional diagram showing a notebook computer according to an embodiment of the invention.

FIG. 1 is a three-dimensional diagram showing a notebook computer 100 according to an embodiment of the invention. The notebook computer 100 may includes a first body 110, a second body 120, a first pivot 130, and an audio module 140. The first pivot 130 pivotally connects the first body 110 and the second body 120. The audio module 140 is pivotally connected with the second body 120.

Figure 2:
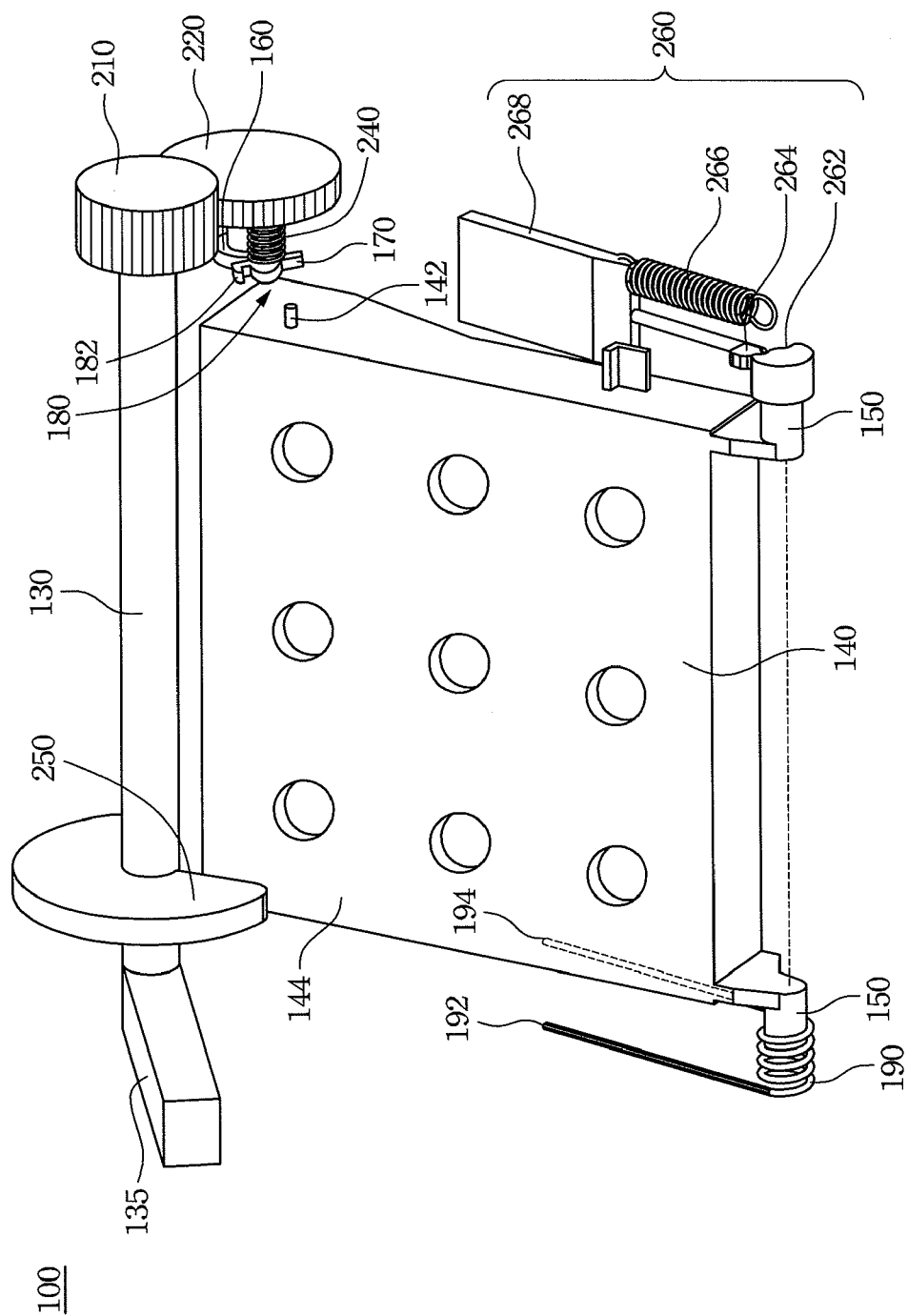
FIG. 2 is a three-dimensional diagram showing detailed structure of the notebook computer in FIG. 1 when the notebook computer is opened.
Figure 3:
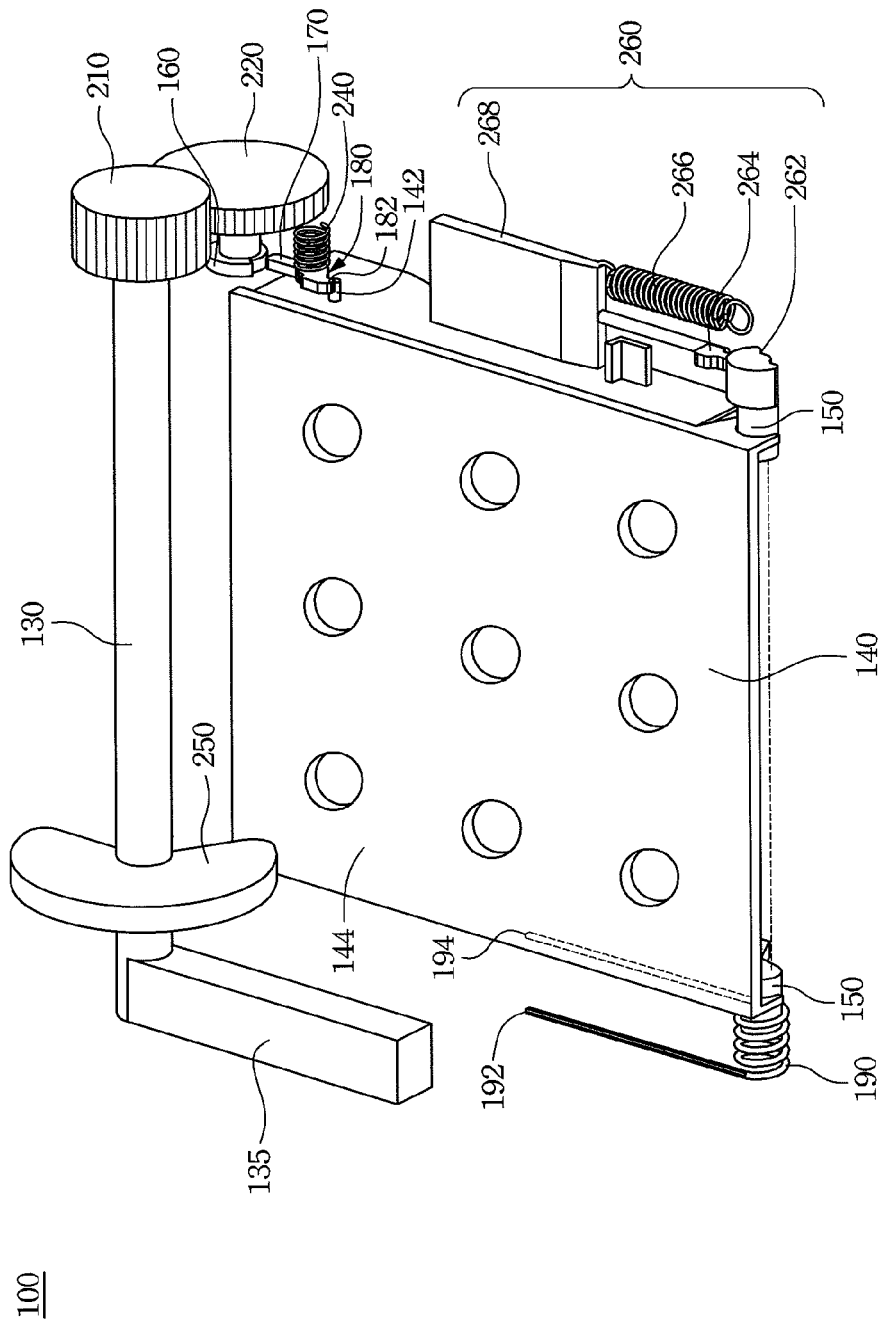
FIG. 3 is a three-dimensional diagram showing detailed structure of the notebook computer in FIG. 1 when the notebook computer is closed.

FIG. 2 is a three-dimensional diagram showing detailed structure of the notebook computer 100 in FIG. 1 when the notebook computer is opened. FIG. 3 is a three-dimensional diagram showing detailed structure of the notebook computer 100 in FIG. 1 when the notebook computer is closed. The first body 110 and the second body 120 are omitted in FIG. 2 to FIG. 6 to clearly show the structure and the actions of the audio module 140.

As shown in FIG. 3, the notebook computer 100 according to the embodiment of the invention may further include a second pivot 150, a cam 160, a follower 170, a latch 180, and an elastic element 190. The second pivot 150 pivotally connects the audio module 140 and the second body. The cam 160 is coupled with the first pivot 130. The follower 170 contacts the cam 160. The latch 180 is fastened to the audio module 140 and connected with the follower 170. The elastic element 190 has two ends 192 and 194, one end 192 is against the second body, and the other end 194 is against the audio module 140.

In detail, the cam 160 may be coupled with the first pivot 130 via various kinds of transmission mechanisms (such as a gear transmission mechanism). For example, the cam 160 of the notebook computer 100 in FIG. 3 is coupled with the first pivot 130 via the gear transmission mechanism. The gear transmission mechanism as stated above may include a first gear 210 and a second gear 220 engaged with each other. The first gear 210 is connected with the first pivot 130, and the second gear 220 is connected with the cam 160.

Additionally, the follower 170 may be directly connected with the latch 180 or indirectly connected with the latch 180 via other transmission mechanisms, as long as the follower 170 is actually interlocked with the latch 180. For example, as shown in FIG. 3, the follower 170 protrudes from the latch 180 toward the cam 160 directly.

The latch 180 may be fastened to the audio module 140 in various kinds of modes. For example, as shown in FIG. 3, the audio module 140 may include a pillar 142. The latch 180 may include a hook 182, and the hook 182 is suited for hooking the pillar 142 of the audio module 140. Manufactures may pivotally connect the latch 180 with the second body via a pivotal pin 230 and dispose the hook 182 and the follower 170 at the two ends of the pivotal pin 230, respectively, in manufacturing.

The elastic element 190 may be a torsion spring in this embodiment. The torsion spring may be sleeved on the second pivot 150 to save inner space of the notebook computer 100. The torsion spring as stated above is just an example, and it is not used for limiting the invention. Any other kind of springs such as a compression spring, an extension spring, or an elastic sheet may be used as the elastic element. Persons having ordinary skill in the art may flexibly choose according to the practical demands.

Figure 4:
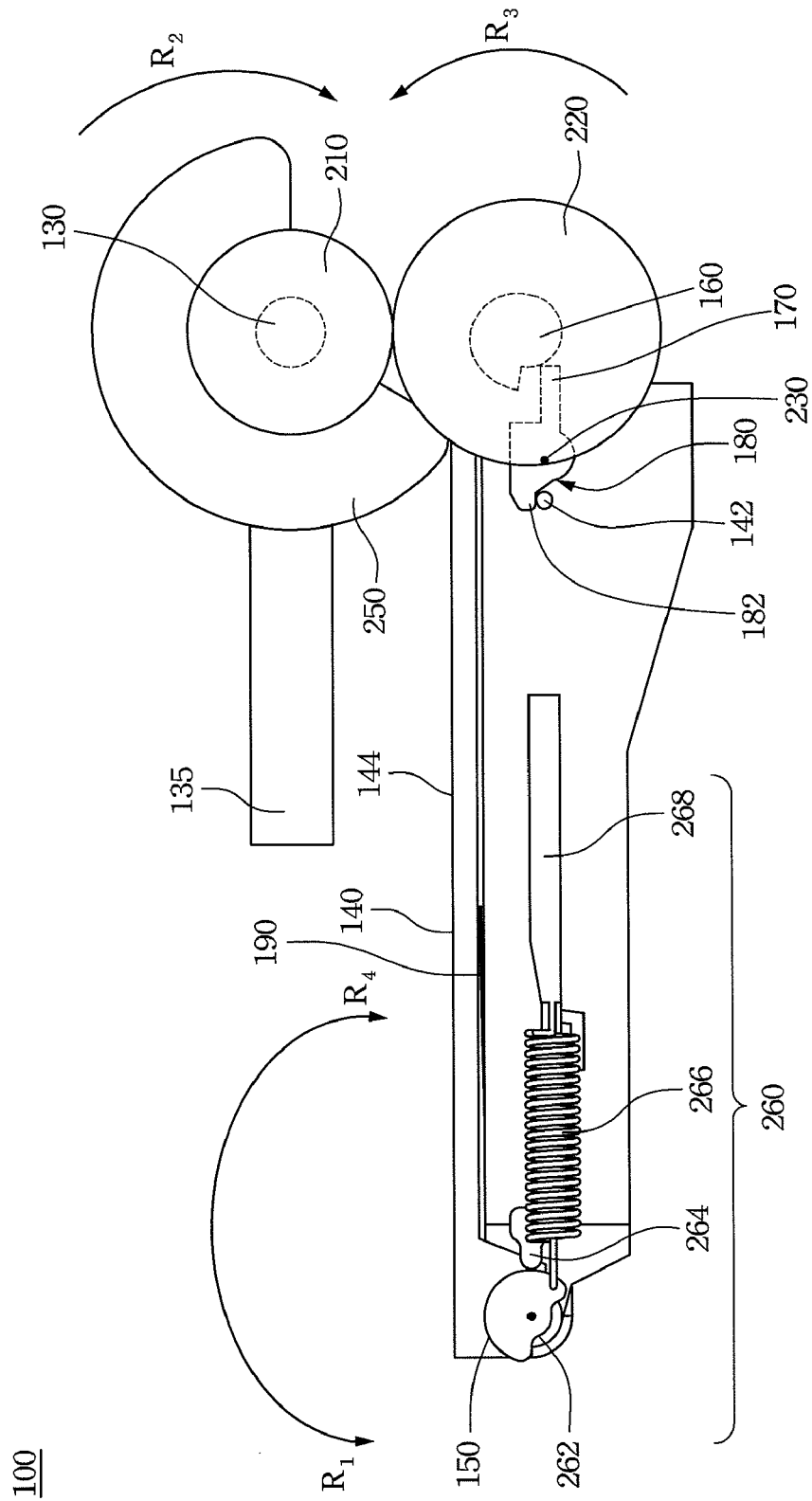
FIG. 4 to FIG. 6 are side views showing that the audio module in FIG. 1 whose state is changed from a closing state to a standing state.
Figure 5:
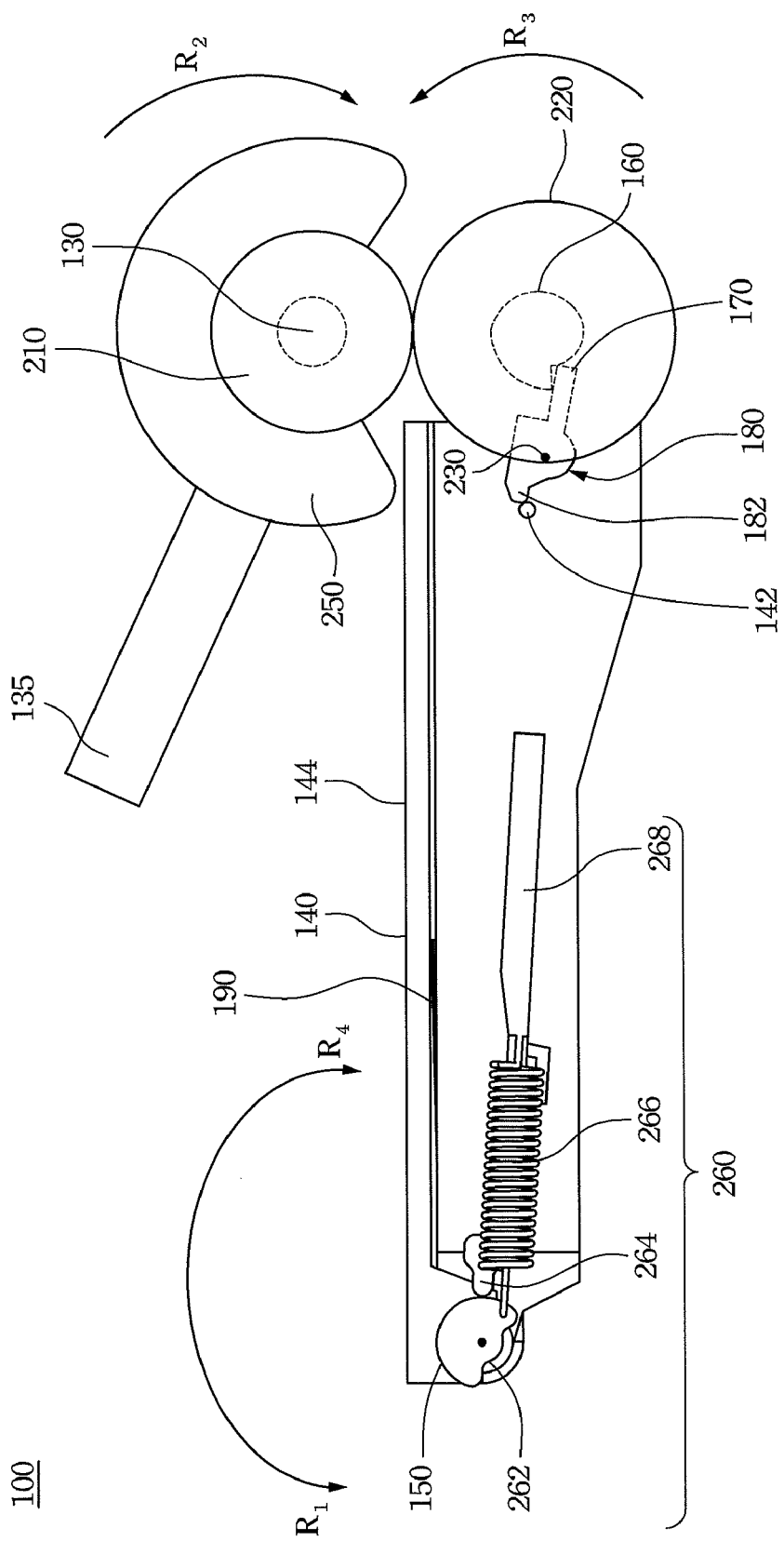
Figure 6:
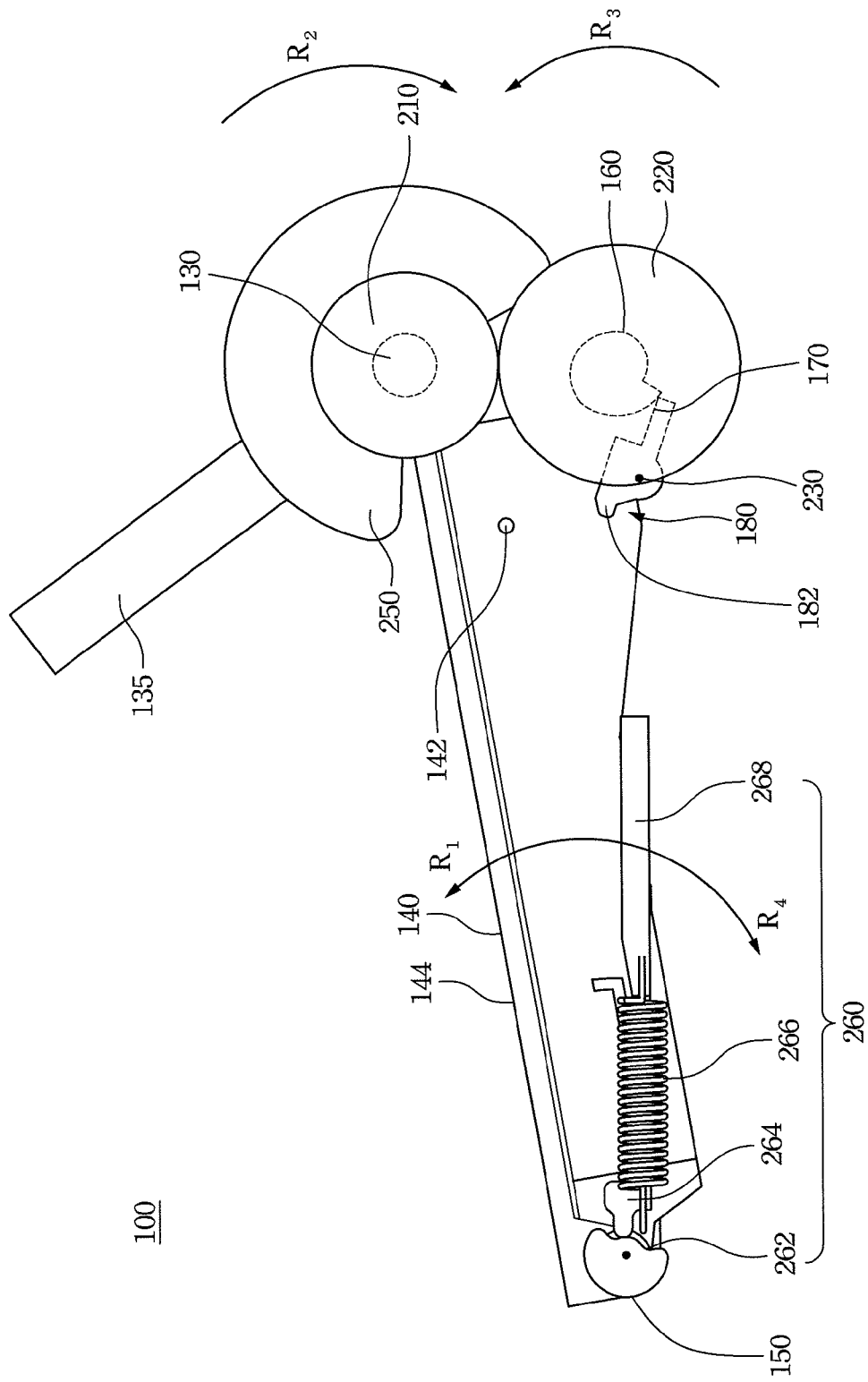

The actions of the notebook computer 100 in this embodiment are specifically illustrated with accompanying FIG. 4 to FIG. 6 taken as an example.

As shown in FIG. 4, when the notebook computer 100 is closed, since the latch 180 is fastened to the audio module 140, the audio module 140 is hold in the second body and compresses the elastic element 190 to store elastic potential energy. That is, since the elastic element 190 is at a compressing state, the audio module 140 bears pre-force for rotating along a single direction (such as an anti-clockwise direction R1) at that moment.

When the user opens the first body and the second body, the first pivot 130 pivotally connected with the first body and the second body drives the first gear 210 to rotate along a clockwise direction R2. Since the first gear 210 and the second gear 220 are engaged with each other at that moment, the second gear 220 drives the cam 160 to rotate along an anti-clockwise direction R3 to push the follower 170 to move downward.

To certainly make the first body and the first pivot 130 interlock, manufacturers may add a connection rod 135 at the first pivot 130 according to the practical demands. The connection rod 135 may be connected with the first body and the first pivot 130 to make the first pivot 130 interlocked to rotate together with the first body when the first body rotates relative to the second body.

The connection rod 135 as stated above is just an example, and it is not used for limiting the invention. The first pivot may be directly connected with the first body without disposing a connection rod in other embodiments. Persons having ordinary skill in the art may flexibly choose according to the practical demands.

When the follower 170 is pushed by the cam 160 to move downward, the hook 182 moves upward at the same time and is released from the pillar 142 of the audio module 140 (as shown in FIG. 5).

Once the latch 180 is detached from the audio module 140, the elastic potential energy released by the elastic element 190 pushes the audio module 140 to rotate to stand along the clockwise direction R1. That is, the audio module 140 is ejected from the second body by the elastic element 190 at that moment and faces the user (as shown in FIG. 6).

The audio module 140 faces the user, which means that an outer decoration board 144 of the audio module 140 faces the user. That is, when the audio module 140 rotates to stand (as shown in FIG. 6), a sound generating unit in the audio module 140 faces the user via the outer decoration board 144 to certainly emit sound toward the user.

The audio module 140 may shake and be instable when it stands. To avoid that the audio module 140 shakes and is instable, the manufacturers may add a brake mechanism 260 at the second pivot 150. In detail, the brake mechanism 260 may include a fixing recess 262, a brake member 264, and a brake elastic member 266. The fixing recess 262 is formed on a side wall of the second pivot 150. The brake elastic member 266 is connected with the brake member 264 and a fixing end (such as a second body) to force the brake member 264 against the side wall of the second pivot 150. Consequently, when the audio module 140 rotates to stand, the brake member 264 is sunk into the fixing recess 262 to restrict the second pivot 150 from rotating any more (as shown in FIG. 6).

The brake elastic member 266 may be indirectly connected with the brake member 264 via a sliding block 268 in this embodiment, which is not used for limiting the invention. The brake elastic member may be directly connected with the brake member in other embodiments of the invention. Persons having ordinary skill in the art may flexibly choose according to the practical demands.

The brake elastic member 266 shown in FIG. 2 to FIG. 6 is the extension spring, but it is used for limiting the invention. Any other kinds of the springs such as the compression spring, the torsion spring, or the elastic sheet may be used as the brake elastic member. Persons having ordinary skill in the art may flexibly choose according to the practical demands.

The brake mechanism 260 as stated above is just an example, but it is not used for limiting the invention. Any other kinds of multi-step adjusting structures may be used to replace the brake mechanism 260. Persons having ordinary skill in the art may flexibly choose according to the practical demands.

Additionally, the notebook computer 100 may include a pressure portion 250. The pressure portion 250 may be connected with the side wall of the first pivot 130. Consequently, when the user closes the first body and the second body, the pressure portion 250 smoothly presses the audio module 140 back into the second body.

In detail, when the user closes the first body and the second body, the pressure portion 250 is against the audio module 140 to force the audio module 140 to rotate back to the second body along a clockwise direction R4 (orderly as shown in FIG. 6 to FIG. 4). At the same time, the elastic element 190 is compressed by the audio module 140 to store the elastic potential energy for next use.

Although the pressure portion 250 in FIG. 1 to FIG. 6 is rod-shaped, but it is not limited thereto. The pressure portion may be an outer housing of the first body in other embodiments of the invention. That is, the user may directly utilize the outer housing of the first body to press the audio module back into the second body, which does not need to add an additional rod-shaped pressure portion. Persons having ordinary skill in the art may flexibly choose according to the practical demands.

Additionally, to make the latch 180 auto-reposition and fastened to the audio module 140, the manufacturers may add a reposition elastic member 240 (as shown in FIG. 2 and FIG. 3) on the latch 180, and the reposition elastic member 240 may be connected with the second body and the latch 180 to maintain the relative position between the latch 180 and the second body.

In detail, the reposition elastic member 240 may be the torsion spring. As a result, when the user opens the first body and the second body, the reposition elastic member 240 is twisted to store the elastic potential energy (as shown in FIG. 2). When the user closes the first body and the second body, the reposition elastic member 240 releases the stored elastic potential energy to spring the latch 180 to an original position (such as a horizontal position) and be fastened to the audio module 140 (as shown in FIG. 3).

Any other kinds of springs may be used as the reposition elastic member in this embodiment, it may be flexibly chosen by persons having ordinary skill in the art according to the practical demands.

As shown in FIG. 1, the second body 120 in this embodiment may include a recess 122, and the recess 122 may accommodate the audio module 140 therein to reduce the thickness of the closed notebook computer 100. The recess 122 may be formed at a side of the second body 120 facing the first body 110 and adjacent to the first pivot 130 in this embodiment, which is not used for limiting the invention. Persons having ordinary skill in the art may flexibly choose the modes of the recess 122 according to the practical demands.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising:
   a first body;
   a second body;
   a first pivot pivotally connecting the first body with the second body;
   an audio module disposed at the second body;
   a second pivot pivotally connecting the audio module with the second body;
   a cam coupled with the first pivot;
   a follower contacting the cam;
   a latch fastened to the audio module and connected with the follower; and
   an elastic element including two ends, wherein one ends against the second body, and the other ends against the audio module.

2. The electronic device according to claim 1, further comprising:
   a first gear connected with the first pivot; and
   a second gear connected with the cam and engaged with the first gear.

3. The electronic device according to claim 1, wherein the second body comprises:
   a recess accommodating the audio module.

4. The electronic device according to claim 1, further comprising:
   a pressure portion connected with a side wall of the first pivot and being against the audio module.

5. The electronic device according to claim 1, further comprising:
   a reposition elastic member connected with the second body and the latch.

6. The electronic device according to claim 5, wherein the reposition elastic member is a torsion spring.

7. The electronic device according to claim 1, wherein the audio module comprises a pillar protrudently disposed on the audio module, and the latch comprises a hook hooking the pillar of the audio module.

8. The electronic device according to claim 1, further comprising:
   a fixing recess formed at a side wall of the second pivot;
   an brake member; and
   an brake elastic member connecting between the brake member and the second body, and forcing the brake member to be against the side wall of the second pivot.

9. The electronic device according to claim 1, wherein the elastic element is a torsion spring.

10. The electronic device according to claim 1, further comprising:
    a connection rod connected with the first body and the first pivot.

* * * * *